(12) United States Patent
Smith et al.

(10) Patent No.: US 11,110,470 B2
(45) Date of Patent: Sep. 7, 2021

(54) SYSTEM AND METHOD FOR CONTROLLING THE OPERATION OF AGRICULTURAL SPRAYERS

(71) Applicant: CNH Industrial America LLC, New Holland, PA (US)

(72) Inventors: Kevin M. Smith, Narvon, PA (US); Trevor Stanhope, Darien, IL (US)

(73) Assignee: CNH Industrial America LLC, New Holland, PA (US)

( * ) Notice: Subject to any disclaimer, the term of this patent is extended or adjusted under 35 U.S.C. 154(b) by 629 days.

(21) Appl. No.: 15/979,739

(22) Filed: May 15, 2018

(65) Prior Publication Data

US 2019/0351434 A1    Nov. 21, 2019

(51) Int. Cl.
*B05B 1/20* (2006.01)
*A01M 7/00* (2006.01)

(52) U.S. Cl.
CPC ............. *B05B 1/20* (2013.01); *A01M 7/0089* (2013.01); *B60W 2300/154* (2013.01)

(58) Field of Classification Search
CPC ....... B05B 1/20; B05B 12/124; B05B 12/122; A01M 7/0089; B60W 2300/154
See application file for complete search history.

(56) References Cited

U.S. PATENT DOCUMENTS

| | | | |
|---|---|---|---|
| 5,278,423 A | 1/1994 | Wangler et al. | |
| 6,216,614 B1 | 4/2001 | Wollenhaupt | |
| 8,942,893 B2 | 1/2015 | Rosa et al. | |
| 9,002,566 B2 | 4/2015 | McClure et al. | |
| 9,226,490 B2 | 1/2016 | Keye | |
| 9,288,938 B2 | 3/2016 | Cavender-Bares et al. | |
| 9,585,309 B2 | 3/2017 | Posselius et al. | |
| 9,615,501 B2 | 4/2017 | Pickett et al. | |
| 9,763,437 B2 | 9/2017 | Schnaider et al. | |
| 9,781,915 B2 | 10/2017 | Gattis et al. | |
| 2011/0153168 A1 | 6/2011 | Peterson et al. | |
| 2011/0266365 A1* | 11/2011 | Hrnicek | A01C 23/008 239/164 |
| 2017/0010619 A1 | 1/2017 | Foster et al. | |
| 2017/0027103 A1 | 2/2017 | Grotelueschen et al. | |
| 2017/0227969 A1 | 8/2017 | Murray et al. | |

(Continued)

FOREIGN PATENT DOCUMENTS

WO    WO 2008/098290    8/2008

*Primary Examiner* — Robert T Nguyen
(74) *Attorney, Agent, or Firm* — Rebecca L. Henkel; Rickard K. De Mille (57) ABSTRACT

In one aspect, a system for controlling the operation of agricultural sprayers may a vision-based sensor configured to capture data indicative of one or more features within a field across which an agricultural sprayer is traveling. A controller of the system may be configured to identify the one or more features within the field based on the data received from the vision-based sensor and determine a position of a boom component of the agricultural sprayer relative to the one or more identified features. Furthermore, the controller may also be configured to initiate a control action to adjust the position of the boom component when it is determined that the relative position between the boom component and the one or more identified features is offset from a predetermined positional relationship defined for the boom component.

15 Claims, 5 Drawing Sheets

(56) References Cited

U.S. PATENT DOCUMENTS

2017/0325444 A1   11/2017  Crinklaw et al.
2018/0243773 A1*  8/2018  Davis .................. A01C 23/007
2018/0317372 A1* 11/2018  Schleicher ........... A01B 69/004
2019/0126308 A1*  5/2019  Hendrickson ....... A01M 21/043
2019/0128864 A1*  5/2019  Pickett .................. G01N 33/24
2021/0127658 A1*  5/2021  Luebke ............... A01M 7/0078

* cited by examiner

SYSTEM AND METHOD FOR CONTROLLING THE OPERATION OF AGRICULTURAL SPRAYERS

FIELD

The present disclosure generally relates to agricultural sprayers and, more particularly, to systems and methods for controlling the operation of an agricultural sprayer as the sprayer is traveling across a field based on feedback received from one or more vision-based sensors.

BACKGROUND

Agricultural sprayers apply an agricultural substance (e.g., a pesticide, a fungicide, and/or the like) onto crops as the sprayer is traveling across a field. To facilitate such travel, sprayers are configured as self-propelled vehicles or implements towed behind an agricultural tractor or other suitable work vehicle. A typical sprayer includes one or more outwardly-extending booms on which a plurality of spaced apart nozzles is mounted. Each nozzle is configured to dispense or otherwise spray the agricultural substance onto underlying crops.

Many crops, such as corn and soybeans, are planted in rows. When spraying row crops, the sprayer is positioned within the field such that each nozzle mounted on the boom(s) is aligned with one of the crop rows. In this regard, as the sprayer is traveling across the field, each nozzle dispenses the agricultural substance onto the plants within the corresponding crop row (e.g., every row, every other row, every third row, etc.). In the event that a direction of travel of the sprayer deviates from the direction of the crop rows, the nozzles may dispense a portion of the agricultural substance onto the ground or not properly cover the corresponding crop row.

In certain instances, sprayers include a GNSS-based positional guidance system that determines a target path across the field based on the predicted location of the crop rows. However, the actual location of the crop rows or portions thereof may deviate from the target path determined by the guidance system. Accordingly, an improved system and method for controlling the operation of an agricultural sprayer that allows the nozzles of the sprayer to be maintained in alignment with the underlying crops would be welcomed in the technology.

BRIEF DESCRIPTION

Aspects and advantages of the technology will be set forth in part in the following description, or may be obvious from the description, or may be learned through practice of the technology.

In one aspect, the present subject matter is directed to a system for controlling the operation of agricultural sprayers. The system may include an agricultural sprayer having an outwardly extending boom and a plurality of nozzles mounted on the boom. The system may further include a vision-based sensor configured to capture data indicative of one or more features within a field across which the agricultural sprayer is traveling. Moreover, the system may include a controller communicatively coupled to the vision-based sensor. The controller may be configured to identify the one or more features within the field based on the data received from the vision-based sensor and determine a position of a boom component of the agricultural sprayer relative to the one or more identified features. Additionally, the controller may also be configured to initiate a control action to adjust the position of the boom component when it is determined that the relative position between the boom component and the one or more identified features is offset from a predetermined positional relationship defined for the boom component.

In another aspect, the present subject matter is directed to an agricultural sprayer. The agricultural sprayer may include a frame and a tank mounted on the frame, with the tank being configured to store an agricultural substance. The agricultural sprayer may also include a boom extending outwardly from the frame and a plurality of nozzles mounted on the boom, with each nozzle being configured to dispense the agricultural substance stored within the tank. Furthermore, the system may include a vision-based sensor positioned on the agricultural sprayer such that the vision-based sensor has a field of view directed toward a portion of a field across within the agricultural sprayer is traveling, with the vision-based sensor being configured to capture data indicative of one or more features within the field. Moreover, the agricultural sprayer may include a controller communicatively coupled to the vision-based sensor. The controller may be configured to identify the one or more features within the field based on the data received from the vision-based sensor and determine a position of a boom component of the agricultural sprayer relative to the one or more identified features. Moreover, the controller may also be configured to initiate a control action to adjust the position of the boom component when it is determined that the relative position between the boom component and the one or more identified features is offset from a predetermined positional relationship defined for the boom component.

In a further aspect, the present subject matter is directed to a method for controlling the operation of an agricultural sprayer. The agricultural sprayer may include an outwardly extending a boom. The method may include identifying, with a computing device, one or more features within the field across which the agricultural sprayer is traveling based on data received from a vision-based sensor. The method may also include determining, with the computing device, a position of a boom component of the agricultural sprayer relative to the one or more identified features. Furthermore, the method may include initiating, with the computing device, a control action to adjust the position of the boom component when it is determined that the relative position between the boom component and the one or more identified features is offset from a predetermined positional relationship defined for the boom component.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Repeat use of reference characters in the present specification and drawings is intended to represent the same or analogous features or elements of the present technology.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for controlling the operation of agricultural sprayers. Specifically, in several embodiments, a controller of the disclosed system may be configured to identify one or more features within the field, such as crop rows or seedbed ridges, based on data received from one or more vision-based sensors (e.g., a light detection and ranging (LIDAR) sensor(s) and/or a camera(s)). The controller may then be configured to determine a position of one or more of the boom components of the sprayer relative to the identified feature(s). For example, in one embodiment, the controller may be configured to determine the position of a nozzle or a wheel coupled to or mounted on the boom relative to the identified feature(s), such as an adjacent crop row or seedbed ridge. In other embodiments, the controller may be configured to determine the positions of one or more de-tasselers, Y-drop nozzles, ground engaging coulters (or associated linkages or brackets) and/or any other suitable components mounted on the booms relative to the identified feature(s). Thereafter, the controller may be configured to initiate a control action to adjust the position of the boom component when it is determined that the relative position between the boom component and the one or more identified features is offset from a predetermined positional relationship. For instance, the controller may be configured to adjust a direction of travel of the sprayer to reduce a lateral distance defined between the boom component and the one or more identified features, such as when the controller is configured to adjust the direction of travel to bring one or more of the sprayer's nozzles into lateral alignment with the crop rows being sprayed by the sprayer (e.g., every row, every other row, every third row, etc.).

Figure 1:
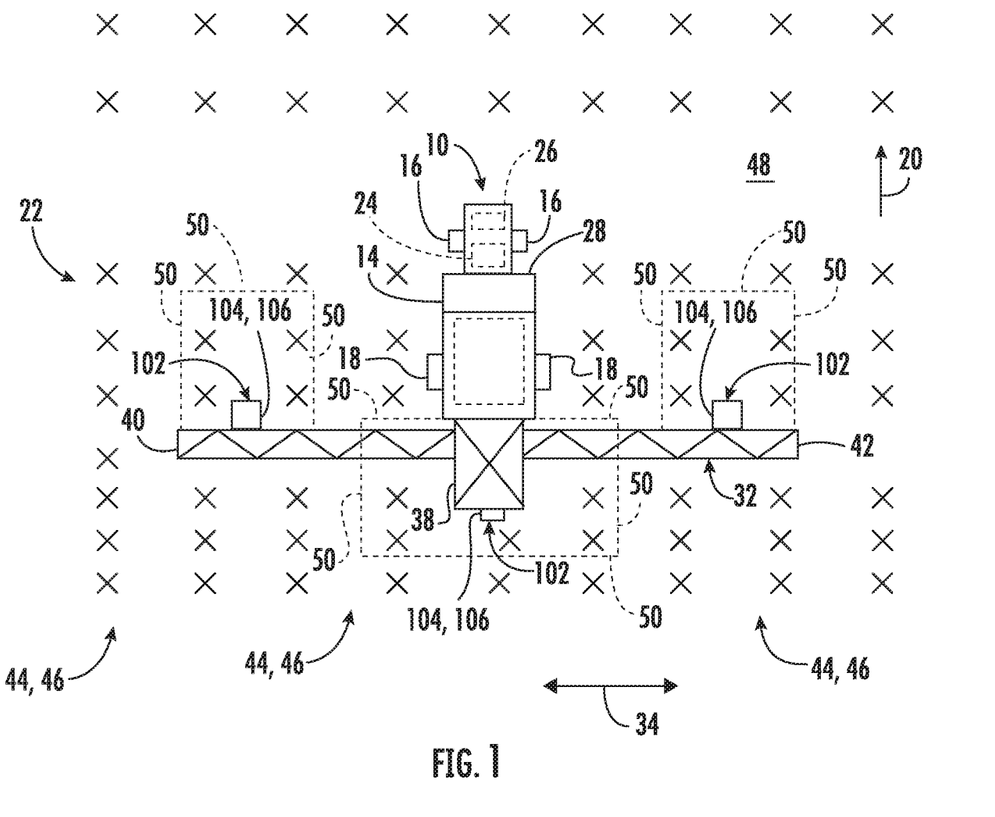
FIG. 1 illustrates a top view of one embodiment of an agricultural sprayer in accordance with aspects of the present subject matter, particularly illustrating the sprayer being configured as a self-propelled sprayer.
Figure 2:
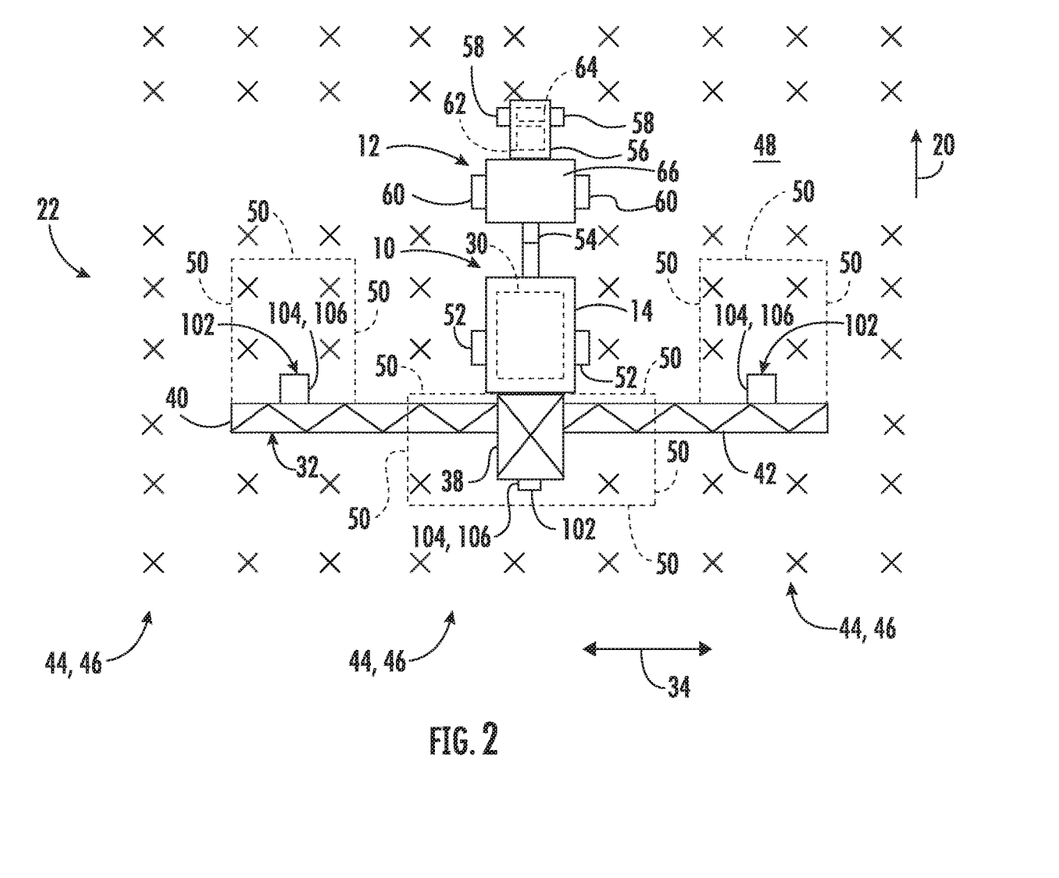
FIG. 2 illustrates a top view of another embodiment of an agricultural sprayer in accordance with aspects of the present subject matter, particularly illustrating the sprayer being configured to be towed by a work vehicle.

Referring now to FIG. 1, a top view of one embodiment of an agricultural sprayer 10 is illustrated in accordance with aspects of the present subject matter. As shown, the sprayer 10 is configured as a self-propelled vehicle. However, as will be described below, in other embodiments, the sprayer 10 may also be configured as an implement configured to be towed by a work vehicle 12 (FIG. 2).

As shown, the sprayer 10 may include a frame or chassis 14 configured to support or couple to a plurality of components. For example, a pair of steerable front wheels 16 and a pair of driven rear wheels 18 may be coupled to the frame 14. The wheels 16, 18 may be configured to support the sprayer 10 relative to the ground and move the sprayer 10 in a direction of travel 20 across a field 22. In this regard, the sprayer 10 may include an engine 24 configured to power the wheels 16, 18 and a steering actuator 26 configured to adjust the orientation of the steerable wheels 16 relative to the frame 14. For example, the steering actuator 26 may correspond to an electric motor, a linear actuator, a hydraulic cylinder, a pneumatic cylinder, or any other suitable actuator coupled to suitable mechanical assembly, such as a rack and pinion or a worm gear assembly. Furthermore, the frame 14 may also support an operator's cab 28 and a tank 30 configured to store or hold an agricultural substance, such as a pesticide, a fungicide, a rodenticide, a fertilizer, or a nutrient. Additionally, the sprayer 10 may include one or more booms 32 extending outwardly from the frame 14 along a lateral direction 34, with the lateral direction 34 extending generally perpendicular the direction of travel 20. As will be described below, a plurality of nozzles 36 (FIG. 3) configured to dispense the agricultural substance stored in the tank 30 may be coupled to the boom(s) 32. In the embodiment shown in FIG. 1, the sprayer 10 includes a center boom 38 and a pair of wing booms 40, 42 extending outwardly from the center boom 38 along the lateral direction 34. However, it should be appreciated that, in alternative embodiments, the sprayer 10 may include any other suitable number and/or configuration of booms 32, such as more or fewer than three booms 32. Furthermore, it should be appreciated that the sprayer 10 may include any other suitable configuration of components.

In accordance with aspects of the present disclosure, the sprayer 10 may include one or more vision-based sensors 102 configured to capture data indicative of one or more features within the field 22 across which the sprayer 10 is traveling. Specifically, in several embodiments, the vision-based sensor(s) 102 may be configured to capture data indicative of one or more crops rows 44 or one or more seedbed ridges 46 positioned underneath, in front of, and/or behind the boom(s) 32 relative to the direction of travel 20. As will be described below, the data captured by the vision-based sensor(s) 102 may then be used to identify the crop rows 44 or seedbed ridges 46 within the field 22. In one embodiment, the vision-based sensor(s) 102 may be configured to continuously capture data of the crop rows 44 or the seedbed ridges 46 positioned underneath, in front of, and/or behind the boom(s) 32 as the sprayer 10 is moved through the field. However, it should be appreciated that the vision-based sensor(s) 102 may be configured to capture data indicative of any other suitable type of crop and/or topographical feature within the field 22, such as a headlands region 48.

As shown, in one embodiment, the vision-based sensor(s) 102 may be installed or otherwise positioned on the sprayer 10. Specifically, in several embodiments, the vision-based sensor 102 may be positioned on the sprayer 10 such that the vision-based sensor(s) 102 has a field of view (e.g., as indicated by dashed lines 50 in FIG. 1) directed toward a location underneath, in front of, and/or behind the boom(s) 32. For example, as shown, in one embodiment, one vision-based sensor device 102 may be coupled to a rear end of the center boom 38, thereby providing such sensor 102 a field of view underneath and/or behind the boom(s) 32. Another vision-based sensor 102 may be coupled to a front end of each wing boom 40, 42, thereby providing such sensors 102 a field of view in front of the boom(s) 32. As such, the vision-based sensor 102 may be able to capture data of the crop rows 44 or seedbed ridges 46 location underneath, in front of, and/or behind the center boom 38 and/or the wing booms 40, 42 relative to the direction of travel 20. However, it should be appreciated that, in alternative embodiments, the vision-based sensor 102 may be positioned at any other suitable location on and/or coupled to any other suitable component of the sprayer 10, on a top of the tank 30 or on a roof of the operator's cab 28. Furthermore, it should be appreciated that the sprayer 10 may include any other suitable number of vision-based sensors 102, such as more or fewer than three sensors 102.

It should be appreciated that, in one embodiment, the vision-based sensor 102 may be configured to capture data indicative of the portions of the crop rows 44 or seedbed ridges 46 be positioned within fifty feet in front of or behind the boom(s) 32, such as within forty feet in front of or behind the boom(s) 32, within thirty feet in front of or behind the boom(s) 32, within twenty feet in front of or behind the boom(s) 32, and/or within ten feet in front of or behind the boom(s) 32. In a further embodiment, the vision-based sensor 102 may be configured to capture data indicative of the portions of the crop rows 44 or seedbed ridges 46 positioned in front of the boom(s) 32 that the boom(s) 32 will encounter such crop rows 44 or seedbed ridges 46 within five seconds of continued travel of the sprayer 10, such as within four seconds, within three seconds, within two seconds, within one second, and/or within less than one second (e.g., fractional seconds). In an additional embodiment, the vision-based sensor 102 may be configured to capture data indicative of the portions of the crop rows 44 or seedbed ridges 46 positioned behind of the boom(s) 32 that the boom(s) 32 has encountered such crop rows 44 or seedbed ridges 46 within last five seconds of travel of the sprayer 10, such as within four seconds, within three seconds, within two seconds, within one second, and/or less than one second (e.g., fractional seconds). In alternative embodiments, however, the portions of the crop rows 44 or seedbed ridges 46 detected by the vision-based sensor 102 in front of or behind the boom(s) 32 may be any other suitable distance in front or behind the boom(s) 32.

In several embodiments, the vision-based sensor 102 may correspond to a light detection and ranging (LIDAR) sensor 104. In general, the LIDAR sensor 104 may be configured to capture a point cloud of data points within a three-dimensional space within the field of view 50 of the LIDAR sensor 104. Such data points may be indicative of one or more features, such as the crop rows 44 or the seedbed ridges 46, within the field of view 50 of the LIDAR sensor 104. In this regard, and as will be described below, the captured point cloud may be used to identify the position of the crop rows 44 or the seedbed ridges 46 positioned underneath, in front of, and/or behind the boom(s) 32. In one embodiment, the LIDAR sensor 104 may be a solid state LIDAR sensor. However, it should be appreciated that the LIDAR sensor 104 may correspond to any other suitable type of LIDAR sensor.

In other embodiments, the vision-based sensor(s) 102 may correspond to a camera 106. In general, the camera 106 may be configured to capture images (e.g., RGB images, NIR images, or CIR images) of one or more features, such as the crop rows 44 or the seedbed ridges 46, within the field of view 50 of the camera 106. In this regard, and as will be described below, the captured images may be used to identify the crop rows 44 or the seedbed ridges 46 positioned underneath, in front of, and/or behind the boom(s) 32, such as by using any suitable image processing technique. In one embodiment, the camera 106 may be a stereovision camera. However, it should be appreciated that the camera 106 may correspond to any other suitable type of camera. Furthermore, it should be appreciated that, in further embodiments, the vision-based sensor 102 may correspond to any other suitable sensor or sensing device configured to capture vision-based data that can be analyzed to identify one or more features within the field.

Referring now to FIG. 2, a top view of another embodiment of the agricultural sprayer 10 described above with reference to FIG. 1 is illustrated in accordance with aspects of the present subject matter. As shown, the sprayer 10 may generally be configured the same as or similar to that described above with reference to FIG. 1. For example, the sprayer 10 may include a tank 30 supported on the frame 14 and one or more booms 32 extending outwardly from an associated frame 14 along the lateral direction 34. Furthermore, the sprayer 10 may include one or more vision-based sensors 102, such as one or more LIDAR sensors 104 or one or more cameras 106. However, as shown in FIG. 2, unlike the above-described embodiment, the sprayer 10 is configured as an implement configured to be towed across the field 22 by a work vehicle 12. In this regard, the sprayer 10 may include a pair of wheels 52 coupled to the frame 14 to support the sprayer 10 relative to the ground as the sprayer 10 is towed in the direction of travel 20 across the field 22. Additionally, a hitch assembly 54 may be configured to couple the sprayer 10 to the work vehicle 12, thereby permitting the sprayer 10 to be towed across the field 22 by the work vehicle 12. However, it should be appreciated that the sprayer 10 may include any other suitable configuration of components.

As shown, the work vehicle 12 may be configured as an agricultural tractor. In such an embodiment, the work vehicle 12 may include a frame or chassis 56 configured to support or couple to a plurality of components. For example, a pair of steerable front wheels 58 and a pair of driven rear wheels 60 may be coupled to the frame 56. The wheels 58, 60 may be configured to support the work vehicle 12 relative to the ground and move the work vehicle 12 in the direction of travel 20 across the field 22. In this regard, the work vehicle 12 may include an engine 62 configured to power the wheels 58, 60 and a steering actuator 64 configured to adjust the orientation of the steerable wheels 58 relative to the frame 56. For example, the steering actuator 64 may correspond to an electric motor, a linear actuator, a hydraulic cylinder, a pneumatic cylinder, or any other suitable actuator coupled to suitable mechanical assembly, such as a rack and pinion or a worm gear assembly. Moreover, the frame 56 may also support an operator's cab 66. However, in other embodiments, the work vehicle 12 may be configured as any other suitable work vehicle known in the art, including those for agricultural and construction applications, transport, sport, and/or the like.

Figure 3:
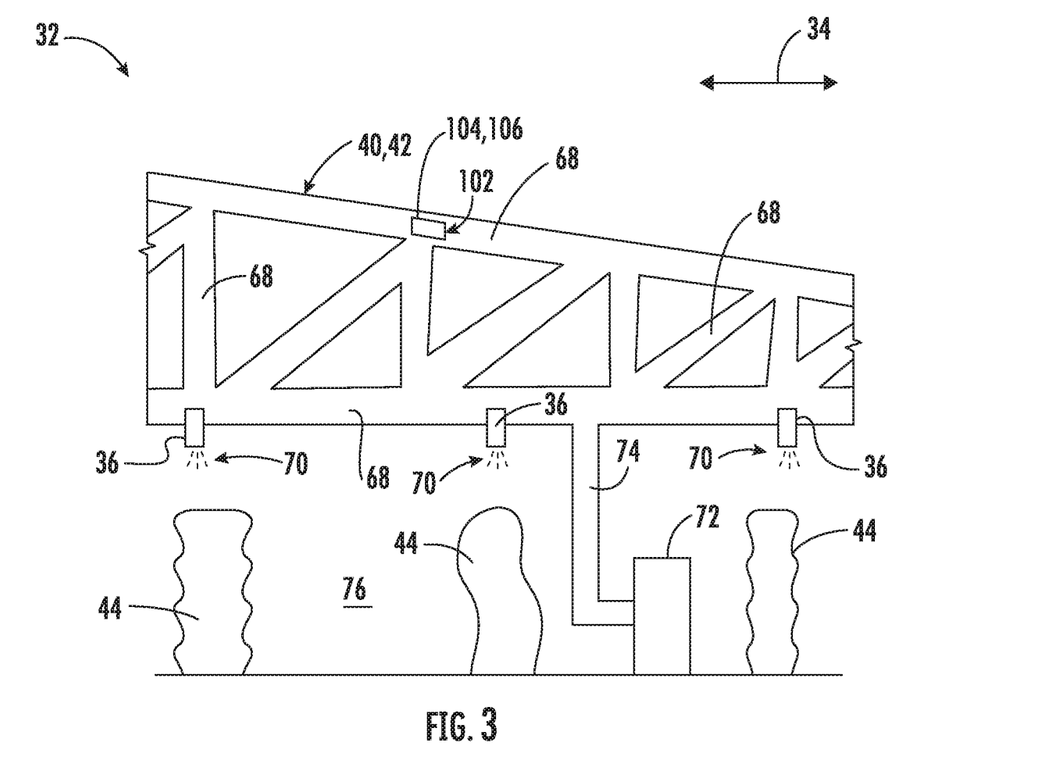
FIG. 3 illustrates a partial front view of one embodiment of a boom suitable for use with the agricultural sprayers shown in FIGS. 1 and 2, particularly illustrating a plurality of nozzles configured to dispense an agricultural substance onto underlying crops in accordance with aspects of the present subject matter.

Referring now to FIG. 3, a partial front view of one embodiment of the one of the booms 32 of the sprayer 10 is illustrated in accordance with aspects of the present disclosure. In particular, a portion of one of the wing booms 40, 42 is illustrated in FIG. 3. However, the center boom 38 may also have a similar configuration. As shown, the wing boom 40, 42 may extend along the lateral direction 34. In this respect, the wing boom 40, 42 generally includes a plurality of structural frame members 68, such as beams, bars, and/or the like, configured to support or couple to a plurality of components. For example, the sprayer's nozzles 36 may be mounted on and/or coupled the frame members 68 of the boom 40, 42, with the nozzles 36 being spaced apart from each other along the lateral direction 34. As indicated above, the nozzles 36 may be configured to dispense or otherwise spray an agricultural substance 70 stored in the tank 30 onto the underlying crop rows 44, such as when the agricultural substance 70 is a pesticide, or onto the underlying ground, such as when the agricultural substance 70 is a fertilizer. In this regard, the sprayer 10 may include various components (not shown), such as fluid conduits, valves, pumps, and/or the like, that are configured to transfer the agricultural substance 70 from the tank 30 to the nozzles 36. Additionally, in one embodiment, one or more wheels 72 may be coupled to the boom 40, 42 by one or more suitable wheel mounts 74 to support the boom 40, 42 relative to the ground.

It should be appreciated that the configuration of the sprayer 10 described above and shown in FIGS. 1 through 3 is provided only to place the present subject matter in an exemplary field of use. Thus, it should be appreciated that the present subject matter may be readily adaptable to any manner of sprayer configuration.

Figure 4:
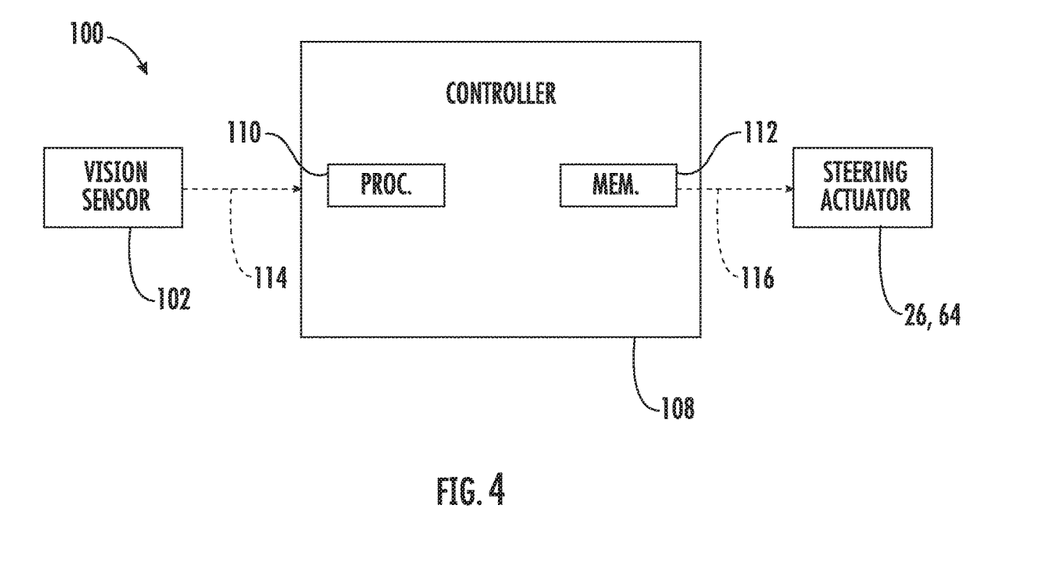
FIG. 4 illustrates a schematic view of one embodiment of a system for controlling the operation of an agricultural sprayer in accordance with aspects of the present subject matter.

Referring now to FIG. 4, a schematic view of one embodiment of a system 100 for controlling the operation of an agricultural sprayer is illustrated in accordance with aspects of the present subject matter. In general, the system 100 will be described herein with reference to the sprayer 10 and the work vehicle 12 described above with reference to FIGS. 1 through 3. However, it should be appreciated by those of ordinary skill in the art that the disclosed system 100 may generally be utilized with sprayers having any other suitable sprayer configuration and/or work vehicles having any other suitable vehicle configuration.

As shown in FIG. 4, the system 100 may include various components of the sprayer 10 and/or the work vehicle 12 described above with reference to FIGS. 1-3. For example, in several embodiments, the system 100 may include the vision-based sensor(s) 102. Additionally, in embodiments in which the sprayer 10 is configured as a self-propelled vehicle, the system 100 may include the steering actuator 26 of the sprayer 10. Conversely, in embodiments in which the sprayer 10 is configured as a towable implement, the system 100 may include the steering actuator 64 of the work vehicle 12. However, it should be appreciated that the system 100 may include any other suitable components of the sprayer 10 and/or the work vehicle 12.

In accordance with aspects of the present subject matter, the system 100 may also include a controller 108 configured to electronically control the operation of one or more components of the sprayer 10 and/or the work vehicle 12. In general, the controller 108 may comprise any suitable processor-based device known in the art, such as a computing device or any suitable combination of computing devices. Thus, in several embodiments, the controller 108 may include one or more processor(s) 110 and associated memory device(s) 112 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 112 of the controller 108 may generally comprise memory element(s) including, but not limited to, a computer readable medium (e.g., random access memory (RAM)), a computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 112 may generally be configured to store suitable computer-readable instructions that, when implemented by the processor(s) 110, configure the controller 108 to perform various computer-implemented functions, such as one or more aspects of the method 200 described below with reference to FIG. 5. In addition, the controller 108 may also include various other suitable components, such as a communications circuit or module, one or more input/output channels, a data/control bus and/or the like.

It should be appreciated that the controller 108 may correspond to an existing controller of the sprayer 10 or the work vehicle 12 or the controller 108 may correspond to a separate processing device. For instance, in one embodiment, the controller 108 may form all or part of a separate plug-in module that may be installed within the sprayer 10 or the work vehicle 12 to allow for the disclosed system and method to be implemented without requiring additional software to be uploaded onto existing control devices of the sprayer 10 or the work vehicle 12.

In several embodiments, the controller 108 may be configured to identify one or more features within the field 22 based on the data received from the vision-based sensor(s) 102. Specifically, as shown in FIG. 4, the controller 108 may be communicatively coupled to the vision-based sensor(s) 102 via a wired or wireless connection to allow data indicative of the one or more features (e.g., indicated by dashed line 114 in FIG. 4) to be transmitted from the vision-based sensor(s) 102 to the controller 108. Upon receipt of the data 114 from the sensor(s) 102, the controller 108 may be configured to analyze or otherwise process the data to identify one or more features within the field 22, such as one or more of the crops row 44 (FIGS. 1 and 2) or the seedbed ridges 46 (FIGS. 1 and 2). In this regard, the controller 108 may include one or more suitable algorithms stored within its memory 112 that, when executed by the processor 110, allow the controller 108 to identify specific feature(s) within the field 22. For example, in embodiments in which the vision-based sensor 102 corresponds to the LIDAR sensor 104, the algorithms may allow the controller 108 to identify a given feature(s) within the point cloud of data points received from the sensor 104. Similarly, in embodiments in which the vision-based sensor 102 corresponds to the camera 106, the algorithms may allow the controller 108 to identify a given feature(s) within the captured images using one or more image processing techniques. Moreover, in one embodiment, the controller 108 may be configured to continuously receive the data 114 captured by the vision-based sensor 102 as the sprayer 10 is moved through the field 22. In such embodiment, the controller 108 may be configured to continuously identify the selected feature(s) within the field 22 as the sprayer 10 is moved relative to such feature(s). For example, the controller 108 may be configured to continuously identify one or more of the crop rows 44 or the seedbed ridges 46 within field 22 based on the data 114 received from the sensor 102.

In several embodiments, the controller 108 may also be configured to determine the position of a boom component of the agricultural sprayer 10 relative to the identified feature(s) within the field 22. More specifically, after identifying the location of the feature(s) within the field 22, the controller 108 may be configured to compare the position of one or more boom component(s) of the sprayer 10 relative to the identified feature(s) within the field 22. Thereafter, the controller 108 may be configured to determine when the relative position between the boom component(s) and the identified feature(s) is offset from or falls outside of a predetermined positional relationship defined for the boom component(s). Specifically, it may be desirable for the boom component(s) to have a given positional relationship relative to the identified feature(s) as the sprayer 10 is traveling across the field 22, such as by maintaining the boom component(s) within a given distance of the identified feature(s). In the event that the identified positional relationship between the boom component(s) and the identified feature(s) is offset from the predetermined positional relationship, the controller 108 may be configured to initiate a control action to adjust the relative positioning of the boom component(s).

In several embodiments, the predetermined position relationship may be associated with a lateral distance defined between the boom component(s) and the identified feature(s) in the lateral direction 34 across the field 22 (i.e., in a direction generally perpendicular to the direction of travel 20 of the sprayer 20). In such embodiments, the controller 108 may be configured to determine the lateral distance defined between the boom component(s) and the identified feature(s) based on the data 114 received from the sensor(s) 102 and compare such lateral distance to a predetermined minimum and/or maximum lateral distance associated with the pre-defined positional relationship defined for the boom component(s). In the event that the determined lateral distance exceeds the maximum predetermined lateral distance or falls below the minimum predetermined lateral distance, the controller 108 may be configured to initiate a control action to adjust the position of the boom component(s) relative to the feature(s) within the field 22. Specifically, in one embodiment, the control action may be configured to reduce the lateral distance between the boom component(s) and the feature(s) when the determined lateral distance exceeds the maximum predetermined lateral distance. Similarly, the control action may be configured to increase the lateral distance between the boom component(s) and the feature(s) when the determined lateral distance falls below the minimum predetermined lateral distance. For example, as will be described below, the controller 108 may be configured to control the operation of the steering actuator 26 of the sprayer 10 and/or the steering actuator 64 of the work vehicle 12 to adjust the direction of travel 20 of the sprayer 10, thereby adjusting the lateral distance between the boom component(s) and the feature(s). However, it should be appreciated that, in alternative embodiments, the controller 108 may be configured to utilize any other suitable positional relationship defined between the boom component(s) and the identified feature(s) within the field to assess when a suitable control action(s) should be initiated to adjust the relative positioning of the bottom component(s).

In one embodiment, the boom component(s) may correspond to one or more of the nozzles 36 mounted on the boom(s) 32. For example, in certain instances (e.g., when the nozzles 36 dispense a pesticide), it may be desirable for the nozzles 36 to generally be laterally aligned with the crop rows 44 such that the nozzles 36 dispense the agricultural substance 70 directly onto the plants within the crop rows 44. For example, the nozzles 36 may generally be laterally aligned with every crop row 44, every other crop row 44, or every third crop row 44, etc. Additionally, only some of the nozzles 36 may be aligned with the crop rows 44. As such, the controller 108 may be configured to identify the crop rows 44 based the data 114 (FIG. 4) received from the vision-based sensor 102 (FIG. 4). The controller 108 may then be configured to determine the lateral distance between one or more of the nozzles 36 and the corresponding crop row 44. Thereafter, the controller 108 may be configured to compare the determined lateral distance to a maximum lateral distance associated with the predetermined position relationship defined between the nozzle(s) 36 and the crop rows 44. In the event that the determined lateral distance exceeds the predetermined maximum lateral distance (e.g., indicating that the nozzle(s) 36 is too far away from the crop row(s) 44), the controller 108 may be configured to initiate a control action to reduce the lateral distance between the nozzle(s) 36 and the corresponding crop row 44. For example, the controller 108 may be configured to control the operation of the steering actuator 26 of the sprayer 10 or the steering actuator 64 of the work vehicle 12 to adjust the direction of the travel 20 of the sprayer 10, thereby reducing the lateral distance between the nozzle(s) 36 and the corresponding crop row 44.

Moreover, in another embodiment, the boom component(s) may correspond to one or more of the wheels 72 mounted on the boom(s) 32. In general, it may be desirable for the wheel(s) 72 to remain positioned within an alley 76 (FIG. 3) defined between adjacent crop rows 44 to prevent the wheel(s) 72 from contacting the plants as the sprayer 10 is moved through the field 22. In this regard, damage to the crop rows 44 may be prevented by maintaining the wheel(s) 72 in a laterally spaced apart relationship with the crop rows 44. In such embodiment, the controller 108 may be configured to identify the location of the crop rows 44 (and, thus, the locations of the alleys 76) based the data 114 (FIG. 4) received from the vision-based sensor 102 (FIG. 4). The controller 108 may then be configured to determine the lateral distance between the wheel(s) 72 and the corresponding crop rows 44 (i.e., the crop rows 44 positioned on either side of the wheel(s) 72). Thereafter, the controller 108 may be configured to compare the determined lateral distance to a minimum lateral distance associated with the predetermined positional relationship defined between the wheel(s) 72 and the crop rows 44. In the event that the determined lateral distance falls below the predetermined minimum lateral distance (e.g., indicating that the wheel(s) 72 is too close to one the crop rows 44), the controller 108 may be configured to initiate a control action to increase the lateral distance between the wheel(s) 72 and the corresponding crop rows 44. For example, the controller 108 may be configured to control the operation of the steering actuator 26 of the sprayer 10 or the steering actuator 64 of the work vehicle 12 to adjust the direction of the travel 20 of the sprayer 10, thereby increasing the lateral distance between the wheel(s) 72 and the corresponding crop rows 44. It should be appreciated that, in alternative embodiments, the boom component(s) may correspond to any other suitable component of the boom 32 or any other component mounted on/coupled to the boom 32, such as a ground engaging coulter(s), a Y-drop(s), a particular frame member(s) 68, a joint(s) between frame members 68, and/or a laterally outward most tip of the boom 32 (i.e., relative to the frame 14 of the sprayer 10).

Referring still to FIG. 4, as indicated above, the controller 108 may be configured to initiate a control action to adjust the position of the boom component(s) relative to the identified feature(s) within the field. Specifically, in several embodiments, the controller 108 may be configured to control the operation of the sprayer 10 and/or the work vehicle 12 to adjust the relative position between the boom component(s) and the feature(s), such as in the lateral direction 34. For example, as shown in FIG. 4, in one embodiment, the controller 108 may be communicatively coupled to the steering actuator 26 of the sprayer 10 or the steering actuator 64 of the work vehicle 12 via a wired or wireless connection to allow control signals (e.g., indicated by dashed line 116 in FIG. 4) to be transmitted from the controller 108 to the steering actuator 26, 64. Based on the received control signals 116, the steering actuator 26, 64 may be configured to adjust the position of the corresponding steerable wheels 16, 58 relative to the associated frame 14, 56 to adjust the direction of travel 20 of the sprayer 10. As is generally understood, adjusting the direction of travel 20 may, in turn, adjust the position of the boom component(s) relative to the identified feature(s) within the field (e.g., by changing the lateral distance between the boom component(s) and the feature(s)). However, it should be appreciated that, in alternative embodiments, the controller 108 may be configured to initiate any other suitable control action configured to adjust the position of the boom component(s) relative to one or more features within the field.

Additionally, in one embodiment, the controller 108 may be configured to detect the presence of crops within the field 22 based on the data 114 received from the vision-based sensor 102. More specifically, as indicated above, some portions of the field 22 may correspond to headlands regions 48 (FIGS. 1 and 2) or may otherwise be free from crops. Based on the data 114 received from the vision-based sensor 102 as the sprayer is moved across the field 22, the controller 108 may be configured to determine when crops are present in the portion of the field 22 across which the sprayer 10 is currently traveling. In the event that no crop is present within the portion of the field being currently traversed by the sprayer (e.g., the sprayer is traveling across the headlands region 48), the controller 108 may be configured to initiate a control action associated with halting the plurality of nozzles 36 (FIG. 3) from dispensing the agricultural fluid 70 (FIG. 3). For example, the controller 108 may be configured to transmit suitable control signals to one or more valves (not shown) configured to selectively occlude the flow of the agricultural substance 70 from the tank 30 (FIGS. 1 and 2). In this regard, when crops are present, the controller 108 may be configured to control the operation of the valve(s) such that the agricultural substance 70 is dispensed from the nozzles 36. Conversely, when crops are not present, the controller 108 may be configured to control the operation of the valve(s) to halt the flow of the agricultural substance 70 to the nozzles 36, thereby preventing further dispensing of the agricultural substance 70.

Figure 5:
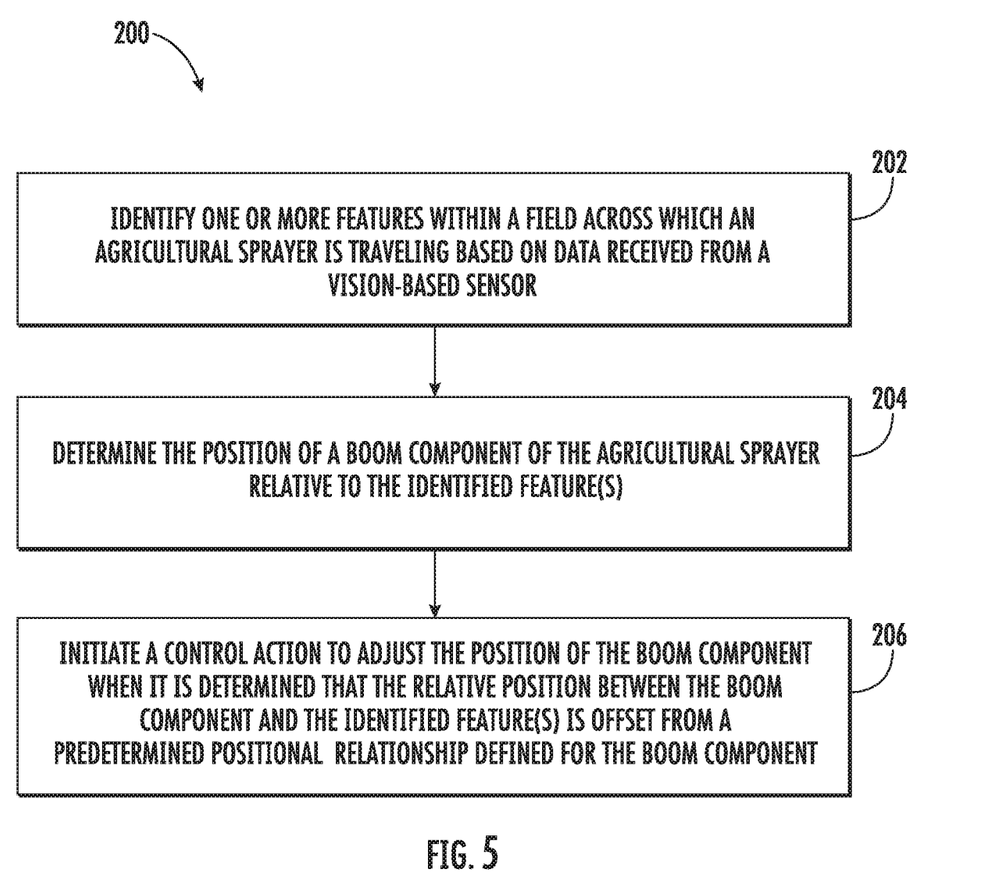
FIG. 5 illustrates a flow diagram of one embodiment of a method for controlling the operation of an agricultural sprayer in accordance with aspects of the present subject matter.

Referring now to FIG. 5, a flow diagram of one embodiment of a method 200 for controlling the operation of an agricultural sprayer is illustrated in accordance with aspects of the present subject matter. In general, the method 200 will be described herein with reference to the sprayer 10, the work vehicle 12, and the system 100 described above with reference to FIGS. 1-4. However, it should be appreciated by those of ordinary skill in the art that the disclosed method 200 may generally be utilized to control the operation of agricultural sprayers having any suitable sprayer configuration and/or in connection with work vehicles having any suitable vehicle configuration and/or systems having any other suitable system configuration. In addition, although FIG. 5 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 5, at (202), the method 200 may include identifying one or more features within the field across which the agricultural sprayer is traveling based on data received from a vision-based sensor. For instance, as described above, the controller 108 may be communicatively coupled to one or more vision-based sensors 102 configured to capture data 114 indicative of one or more features within the field 22, such as one or more crop rows 44 or seedbed ridges 46, across which the sprayer 10 is traveling. As such, data 114 transmitted from the vision-based sensor 102 may be received by the controller 108 and subsequently analyzed and/or processed to identify a given feature(s) within the field 22.

Additionally, at (204), the method 200 may include determining a position of a boom component of the agricultural sprayer relative to the identified features. For instance, as described above, the controller 108 may be configured to determine the position of one or more boom components of the sprayer 10, such as one or more nozzles 36 or wheels 72 coupled to or mounted on the boom 32, relative to the identified feature(s).

Moreover, as shown in FIG. 5, at (206), the method 200 may include initiating a control action to adjust the position of the boom component when it is determined that the relative position between the boom component and the identified feature(s) is offset from a predetermined positional relationship defined for the boom component. For instance, as described above, the controller 108 may be configured to compare the relative position of the boom component(s) to a predetermined positional relationship that is associated with a desired position or positional relationship between the boom component(s) and the identified features(s). In the event that the relative position of the boom component(s) is offset from the predetermined positional relationship, the controller 108 may be configured to initiate a suitable control action to adjust the position of the boom component(s) relative to the identified feature(s), such as by controlling the operation of the steering actuator 26 of the sprayer 10 or the steering actuator 64 of the work vehicle 12.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A method for controlling the operation of an agricultural sprayer, the agricultural sprayer including an outwardly extending boom, the method comprising:

identifying, with a computing device, a crop row or a seedbed ridge present within the field across which the agricultural sprayer is traveling based on data received from a vision-based sensor;

determining, with the computing device, a lateral distance defined between a nozzle of a plurality of nozzles mounted on the boom of the agricultural sprayer and the identified crop row or the identified seedbed ridge in the lateral direction; and initiating, with the computing device, a control action to adjust the position of the nozzle in the lateral direction when the determined lateral distance exceeds a predetermined maximum lateral distance.

2. The method of claim 1, wherein the vision-based sensor comprises a light detection and ranging (LIDAR) sensor.

3. The method of claim 1, wherein the vision-based sensor comprises a camera.

4. The method of claim 1, wherein the vision-based sensor is positioned on the agricultural sprayer such that the vision-based sensor has a field of view directed toward a location in front of the boom.

5. The method of claim 1, wherein the control action corresponds to controlling the operation of a steering actuator of the agricultural sprayer to adjust the direction of travel of the agricultural sprayer such that the position of the nozzle relative to the crop row is adjusted in the lateral direction.

6. The method of claim 1, wherein the control action corresponds to controlling the operation of a work vehicle to which the agricultural sprayer is coupled to adjust the direction of travel of the agricultural sprayer such that the position of the nozzle relative to the identified crop row or the identified seedbed ridge is adjusted in the lateral direction.

7. A system for controlling the operation of agricultural sprayers, the system comprising:

an agricultural sprayer including a boom extending outwardly in a lateral direction and a plurality of nozzles mounted on the boom, the lateral direction extending perpendicular to a direction of travel of the agricultural sprayer;

a vision-based sensor configured to capture data indicative of a crop row or a seedbed ridge present within a field across which the agricultural sprayer is traveling;

a controller communicatively coupled to the vision-based sensor, the controller being configured to:
identify the crop row or the seedbed ridge present within the field based on the data received from the vision-based sensor;
determine a lateral distance defined between a nozzle of the plurality of nozzles and the identified crop row or the identified seedbed ridge in the lateral direction; and
initiate a control action to adjust the position of the nozzle in the lateral direction when the determined lateral distance exceeds a predetermined maximum lateral distance.

8. The system of claim 7, wherein the vision-based sensor comprises a light detection and ranging (LIDAR) sensor.

9. The system of claim 7, wherein the vision-based sensor comprises a camera.

10. The system of claim 7, wherein the vision-based sensor is installed on the agricultural sprayer.

11. The system of claim 7, wherein the vision-based sensor is positioned on the agricultural sprayer such that the vision-based sensor has a field of view directed toward a location in front of the boom.

12. The system of claim 7, wherein the control action corresponds to controlling the operation of a steering actuator of the agricultural sprayer to adjust the direction of travel of the agricultural sprayer such that the position of the nozzle relative to the crop row is adjusted in the lateral direction.

13. The system of claim 7, wherein the control action corresponds to controlling the operation of a work vehicle to which the agricultural sprayer is coupled to adjust the direction of travel of the agricultural sprayer such that the position of the nozzle relative to the identified crop row or the identified seedbed ridge is adjusted in the lateral direction.

14. An agricultural sprayer, comprising:
a frame;
a tank mounted on the frame, the tank being configured to store an agricultural substance;
a boom extending outwardly from the frame in a lateral direction extending perpendicular to a direction of travel of the agricultural sprayer;
a plurality of nozzles mounted on the boom, each nozzle being configured to dispense the agricultural substance stored within the tank;
a vision-based sensor positioned on the agricultural sprayer such that the vision-based sensor has a field of view directed toward a portion of a field across which the agricultural sprayer is traveling, the vision-based sensor being configured to capture data indicative of a crop row present within the field; and
a controller communicatively coupled to the vision-based sensor, the controller being configured to:
identify the crop row within the field based on the data received from the vision-based sensor;
determine a lateral distance defined between a nozzle of the plurality of nozzles and the identified crop row in the lateral direction; and
initiate a control action to adjust the position of the nozzle in the lateral direction when the determined lateral distance exceeds a predetermined maximum lateral distance.

15. The agricultural sprayer of claim 14, wherein the controller is further configured to initiate a control action associated with halting the plurality of nozzles from dispensing of the agricultural substance when no crop row is identified.

* * * * *